United States Patent
Chang et al.

(10) Patent No.: US 7,515,780 B2
(45) Date of Patent: Apr. 7, 2009

(54) SYSTEM AND METHOD FOR FABRICATING AN OPTICAL ISOLATOR

(75) Inventors: Kok Wai Chang, Los Altos, CA (US); Jane D. LeGrange, Princeton, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 31 days.

(21) Appl. No.: 11/586,093

(22) Filed: Oct. 25, 2006

(65) Prior Publication Data

US 2008/0298739 A1    Dec. 4, 2008

(51) Int. Cl.
G02B 6/12    (2006.01)

(52) U.S. Cl. ....................................................... 385/11
(58) Field of Classification Search ................... 385/11
See application file for complete search history.

(56) References Cited

U.S. PATENT DOCUMENTS

| | | | |
|---|---|---|---|
| 5,115,340 A * | 5/1992 | Tidwell | ...................... 359/484 |
| 6,389,186 B1 | 5/2002 | Digiovanni | |
| 6,411,641 B1 * | 6/2002 | Shirai et al. | .................... 372/98 |
| 6,430,343 B1 | 8/2002 | Arney | |
| 6,456,637 B1 | 9/2002 | Holcomb | |
| 6,587,267 B2 | 7/2003 | Tai | |
| 6,625,352 B2 | 9/2003 | Chang | |
| 6,657,785 B2 | 12/2003 | Ducellier | |
| 6,697,198 B2 | 2/2004 | Tai | |
| 6,711,310 B2 | 3/2004 | Chang | |
| 6,748,129 B2 | 6/2004 | Braun | |
| 6,757,451 B2 | 6/2004 | Chang | |
| 6,823,093 B2 | 11/2004 | Chang | |
| 6,934,431 B2 | 8/2005 | Braun | |
| 7,259,913 B2 * | 8/2007 | Iida | ............................. 359/484 |
| 2002/0012167 A1 | 1/2002 | Wills | |
| 2002/0191284 A1 | 12/2002 | Chang | |
| 2003/0053209 A1 | 3/2003 | Chang et al. | |
| 2004/0184148 A1 | 9/2004 | Chang | |

FOREIGN PATENT DOCUMENTS

| | | | |
|---|---|---|---|
| JP | 2002357785 A | * | 12/2002 |
| JP | 2005025138 A | * | 1/2005 |
| JP | 2006030442 A | * | 2/2006 |

* cited by examiner

Primary Examiner—Sarah Song

(57) ABSTRACT

There is provided a system and method for fabricating an optical isolator. More specifically, there is provided a fiber optical isolator comprising a first isolator stage comprising a Faraday rotator configured to adjust the polarity of a light beam, and a heat sink coupled to the Faraday rotator and configured to dissipate heat generated in the Faraday rotator by the light beam.

14 Claims, 3 Drawing Sheets

SYSTEM AND METHOD FOR FABRICATING AN OPTICAL ISOLATOR

GOVERNMENT CONTRACT

This invention was made with Government support. The Government has certain rights in this invention.

BACKGROUND OF THE INVENTION

1. Field of the Invention

This invention relates generally to fiber lasers and amplifiers. More specifically, it pertains to fiber optical isolators, which are used at high operating power in applications such as high power fiber lasers and amplifiers.

2. Discussion of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

Optical isolators typically transmit light in the forward direction with relatively low insertion loss (typically <10% loss), however, backward propagating light may be attenuated by a factor of 1000 to 1,000,000, depending on the design of the isolator. For this reason, optical isolators are often used in fiber lasers and amplifiers to eliminate back reflections, because backward propagating light can damage optical components in the fiber laser and/or amplifier. Furthermore, backward propagating light passing through a gain medium is amplified such that it is more likely to damage components and may cause the laser or amplifier to become unstable.

To reduce the effect of backward light propagation, optical isolators can be placed between amplifier stages or at the output of an amplifier to block back reflections. Conventional optical isolators, however, are limited in their power tolerance. The highest power optical isolators currently available publicly are rated for power between 1 and 2 watts ("W"). This level of power tolerance simply may not be adequate for fiber amplifiers, which can have output powers as high as tens of watts. Isolators that could be used at higher power would be advantageous for higher power fiber amplifiers and lasers because it would enable the isolator to be placed at the output of the amplifier where it could provide greater protection against back reflections.

BRIEF SUMMARY OF THE INVENTION

Certain aspects commensurate in scope with the disclosed embodiments are set forth below. It should be understood that these aspects are presented merely to provide the reader with a brief summary of certain aspects the invention might take and that these aspects are not intended to limit the scope of the invention. Indeed, the invention may encompass a variety of aspects that may not be set forth below.

There is provided a system and method for fabrication of an optical isolator. More specifically, there is provided a fiber optical isolator comprising a first isolator stage including a Faraday rotator configured to adjust the polarity of a light beam, and a heat sink coupled to the Faraday rotator and configured to dissipate heat generated in the Faraday rotator by a light beam.

BRIEF DESCRIPTION OF THE SEVERAL VIEWS OF THE DRAWINGS

Advantages of the invention may become apparent upon reading the following detailed description and upon reference to the drawings in which.

DETAILED DESCRIPTION OF THE INVENTION

Figure 1:
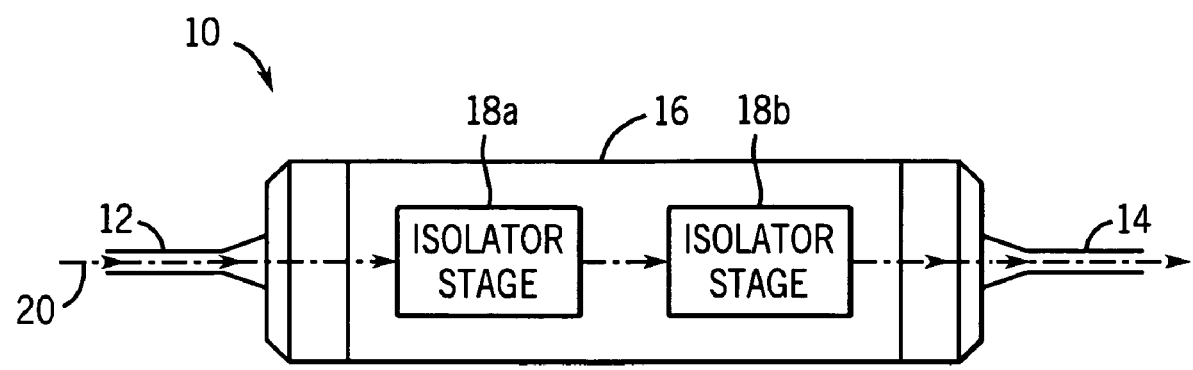
FIG. 1 is a diagram of an exemplary optical isolator in accordance with one embodiment.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments described below may be directed towards a method for improving the high power reliability of an optical isolator. More specifically, one or more of the embodiments described herein may be directed towards an optical isolator employing a Faraday rotator that is coupled to a heat sink to dissipate heat generated when light passes through the garnet in the Faraday rotator. Advantageously, heat sinking the garnet in the Faraday rotator reduces the likelihood of an index gradient forming by reducing the temperature rise in the garnet and, thus, causes isolation to decrease to a lesser extent as a function of power. In addition, another embodiment described herein is directed towards a method for aligning an optical isolator at a use power such that the alignment includes the effective lenses caused by the thermal lens effect. This process can reduce or minimize the insertion loss of the optical isolator at high power.

More specifically, one embodiment described herein provides a method for improving the high power reliability of fiber pigtailed optical isolators. One of the primary failure modes limiting the high power reliability of amplifiers is runaway thermal failure at the fiber ferrule due to absorption of light into the polymer materials in the ferrule and in the pigtail outside the ferrule. These failures are more likely to occur as more light is lost, because light is scattered or incident outside the core of the output fiber instead of coupled into it. Two failure mechanisms leading to increased light dissipated in the ferrule are scattering caused by optical damage at the fiber ferrule input face and thermal lensing in the garnet of the Faraday rotator. Thermal lensing occurs due to the Gaussian profile of the high power light incident on the garnet of the Faraday rotator. Due to the temperature dependent index of refraction of the garnet, an index gradient forms in the garnet. This gradient depends on both ambient temperature and on optical power of the laser. It leads to the formation of an effective optical lens, which results in the degradation of alignment (i.e., there is more light that is lost in the ferrule.) One or more of the embodiments described below relates to the mitigation of the thermal lens effect and, therefore, to the improvement of the high power reliability of fiber optical isolators.

Turning now to FIG. 1, an exemplary optical isolator, in accordance with one embodiment, is illustrated and generally designated by a reference numeral 10. As illustrated, the optical isolator 10 may include an input port 12, an output port 14, and a package 16. In one embodiment, such as the embodiment illustrated in FIG. 1, the optical isolator 10 is a fiber optic component. More specifically, the optical isolator 10 may include one or more bulk optical sub-components through which light passes and then is coupled via a lens to a fiber optic "pigtail." In one embodiment, the optical isolator 10 is connected by fusion splicing of the pigtail to the output fiber of a fiber laser or amplifier.

The package 16 may include the isolator stages 18a and 18b. The isolator stages 18a and 18b may be configured to allow coherent light 20, such as light from a high power coherent source (e.g., a laser or amplifier), to pass through them in one direction (e.g., the direction from the input port 12 to the output port 14) while preventing or greatly reducing transmission of the light 20 in the opposite direction. In one embodiment, the coherent light 20 may be a laser with a wavelength of 1550 nanometers. It will be appreciated, however, that the dual isolator stages 18a and 18b, although typical, are merely exemplary. As such, in alternate embodiments, the optical isolator 10 may include a single isolator stage 18a or a plurality of suitable isolator stages 18a and 18b.

As illustrated in FIG. 1, the light 20 may enter the input port 12, proceed through the isolator stages 18a and 18b, and exit the optical isolator 10 through the output port 14. In various embodiments, the light 20 may be created by a high power laser or a high power amplifier. For example, in one embodiment, the light 20 may have a light power equal to or greater than one watt. In another embodiment, the light 20 may have a light power equal to or greater than four watts. In still another embodiment, the light 20 may have a light power equal to or greater than six watts. In yet another embodiment, the light 20 may have a light power equal to or greater than eight watts. In still another embodiment, the light 20 may have a light power equal to or greater than ten watts.

Figure 2:
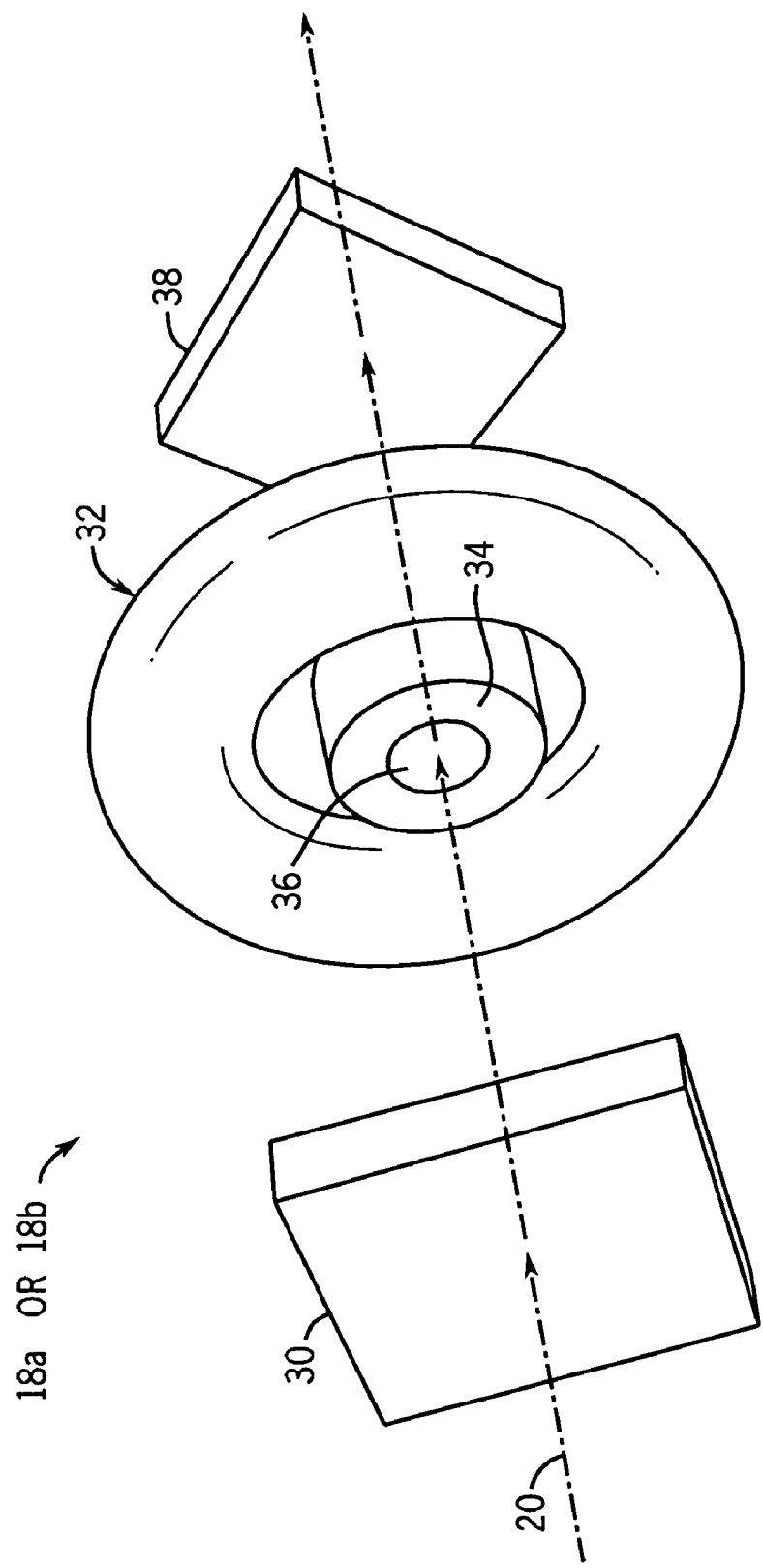
FIG. 2 is a diagram of an exemplary isolator stage in accordance with one embodiment.

As described above, the optical isolator 10 may be configured to operate at higher power levels than conventional optical isolators. More particularly, in one embodiment, the isolator stages 18a and 18b may be configured such that the temperature rise in the garnet caused by high power is reduced. For example, FIG. 2 is a diagram of an exemplary isolator stage 18a and 18b in accordance with one embodiment. As shown in FIG. 2, the isolator stage 18 may include a polarizer 30, a permanent magnet 32, a heat sink 34, a Faraday rotator 36, and an analyzer 38.

When the light 20 enters the isolator stage 18, it passes through the polarizer 30, which is oriented parallel to the state of the light 20. In one embodiment, the polarizer 30 is a birefringent wedge polarizer configured to separate the random polarization state of the light 20 into two orthogonal polarization beams due to double refraction of a birefringent wedge. In alternate embodiments, other types of polarizers 30 may be employed in the optical isolator 10.

The Faraday rotator 36, in combination with the magnet 32, then rotates the polarization of the light 20 by forty-five degrees. In one embodiment, the Faraday rotator 36 may include a Bismuth doped yttrium-iron-garnet ("Bi-YIG") material. It will be appreciated that in other embodiments the Faraday rotator could be based on other materials and that the basic principles governing high power reliability will apply to those materials.

After passing through the Faraday rotator 36, the light 20 passes into the analyzer 38. In one embodiment, the analyzer 38 includes a second birefringent wedge, which has its optical axis oriented at an angle of forty-five degrees relative to the optical axis of the polarizer 30. This orientation permits the light beams to be recombined angularly in the forward direction. Any light reflected off the polarizer 38 will end up passing back through the Faraday rotator 36, which will rotate the polarization another forty-five degrees. This additional rotation will increase the polarity of reflected beams to a total rotation of ninety degrees. When the ninety degree rotated beams reach the birefringent wedge type polarizer 30, they will be angularly separated into two separated beams and will not be coupled back to the input fiber.

Returning to the Faraday rotator 36, when the light 20 hits the Faraday rotator 36, the light 20 will transmit or transfer some amount of energy from itself to the materials of the Faraday rotator 36. More specifically, when the light 20 strikes the Faraday rotator 36, it will excite the atomic structure of the Faraday rotator 36 and cause the temperature of the Faraday rotator 36 to rise. This temperature increase in the Faraday rotator is more pronounced at higher power levels. For example, the light 20 with 10 watts of light power and a wavelength of 1550 nanometers could induce a temperature rise in the Faraday rotator 36 by as much as 60° C.

Increasing the temperature of the Faraday rotator, however, affects the properties of the Faraday rotator 36. More specifically, as the temperature of the Faraday rotator 36 increases, a thermal lensing effect is generated in the Faraday rotator 36. This thermal lens effect (also referred to more simply as a "thermal lens" or "thermal lensing") causes increased insertion loss as the extra lens created displaces the focal point from the fiber core such that the coupling of the light into the core of the fiber pigtail is no longer optimized.

However to reduce the amount of thermal lensing, the isolator stage 18 may advantageously include the heat sink 34 to dissipate the heat generated in the Faraday rotator 36 by light from light 20. By "pulling" heat out of the Faraday rotator 36, the heat sink 34 reduces the temperature of the Faraday rotator 36 and, thus, reduces the thermal lensing effect. This may reduce the percentage of light dissipated in the fiber ferrule and, therefore, reduce the likelihood of failure of the optical isolator 10 at higher power levels. In one embodiment, the heat sink 34 may include gadolinium gallium garnet (also referred to as "GGG" or gadolinium gallium oxide). More specifically, in one embodiment, the heat sink 34 and the Faraday rotator 36 may be created by fabricating Bi-YIG material onto a GGG substrate. In alternate embodiments, however, any suitable material may be used as the heat sink 34.

Figure 3:
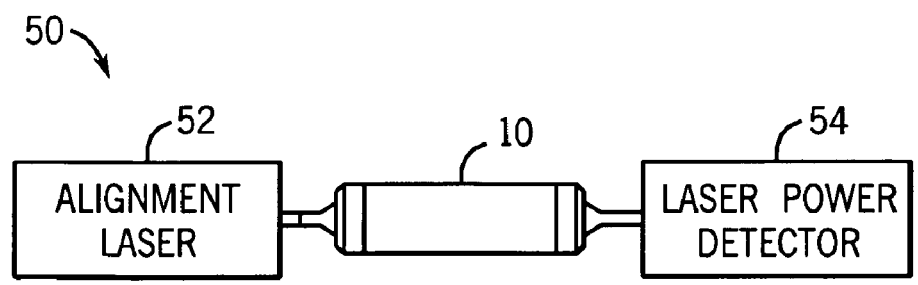
FIG. 3 is a block diagram of an exemplary system for aligning the optical isolator illustrated in FIG. 1 in accordance with one embodiment.
Figure 4:
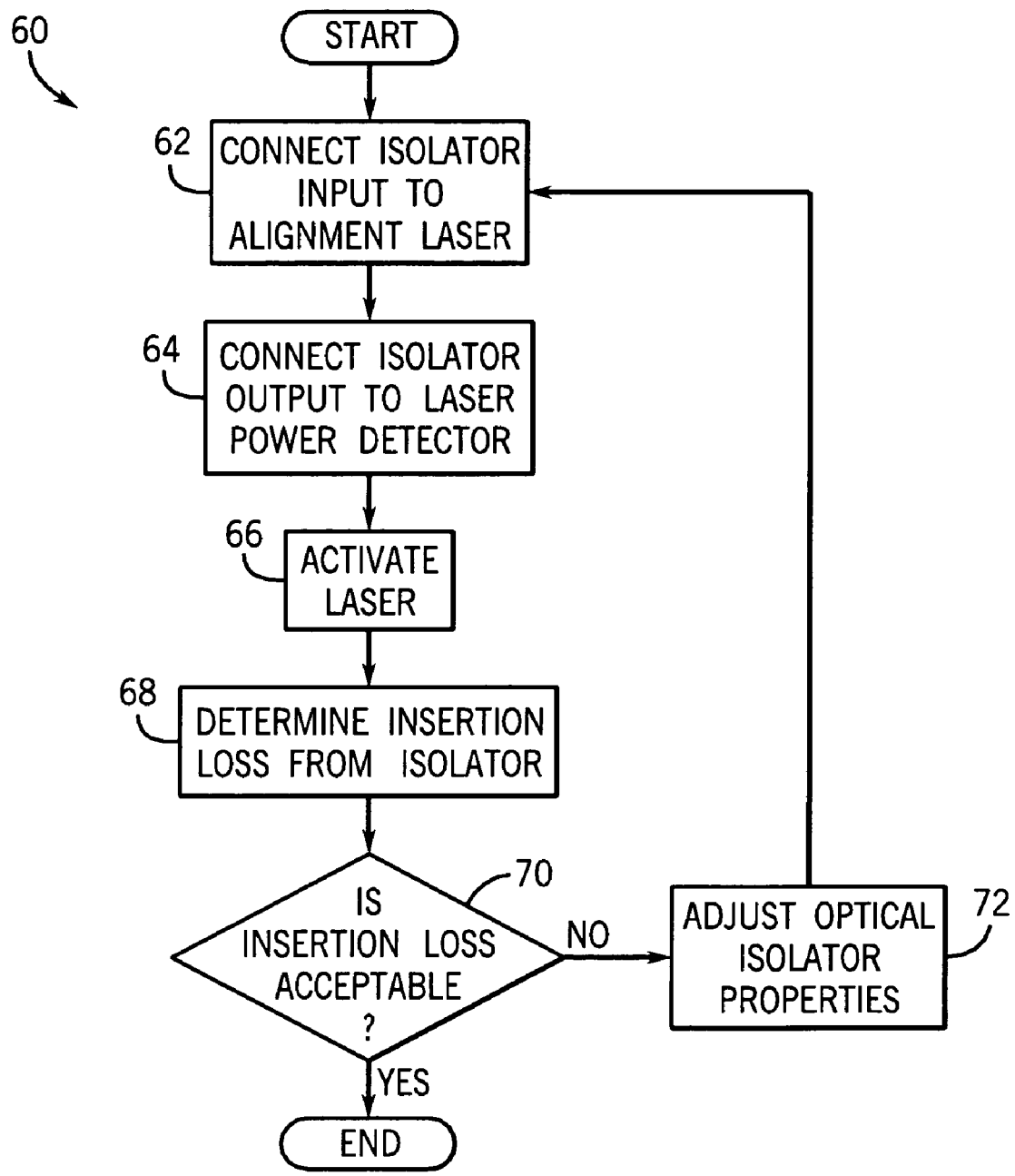
FIG. 4 is a flow chart illustrating an exemplary technique for aligning the optical isolator illustrated in FIG. 1 in accordance with one embodiment.

In one embodiment, the effects of thermal lensing may be mitigated by aligning the optical isolator 10 for a particular target light power. More specifically, whereas conventional optical isolators are aligned to minimize insertion loss with lasers of one watt or less, the optical isolator 10 may be aligned to minimize insertion loss at higher power levels (e.g. two, four, six, eight, ten, or more watts). Accordingly, FIG. 3 is a block diagram of an exemplary system 50 for aligning the optical isolator 10 illustrated in FIG. 1 in accordance with one embodiment, and FIG. 4 is a flow chart illustrating an exemplary technique 60 for calibrating the optical isolator 10 illustrated in FIG. 1 in accordance with one embodiment. As shown in FIG. 3, the system 50 may include the optical isolator 10, a calibration laser 52, and a laser power detector 54. As described below in regard to the technique 60, the system 50 may be employed to align the optical isolator 10 to minimize or reduce insertion loss at higher laser power levels. An isolator aligned for high-power operation may also be used at a lower power. At lower power, however, the thermal lensing effects will be weaker, and may even be absent. As a consequence, there may be some increased insertion loss, but such additional loss is unlikely to cause a catastrophic failure of the optical isolator 10.

As illustrated in FIG. 4, the technique 60 may begin by connecting the optical isolator 10 to the alignment laser 52, as indicated by block 62. In one embodiment, connecting the optical isolator 10 involves connecting the input port 12 to the optical isolator 10 to the laser 52 with a laser light power equal to or greater than 10 W. In an alternate embodiment, lasers with other suitable light power levels, as described above, may also be employed. Further, the technique 60 may also involve connecting the output port 14 of the optical isolator 10 to the laser power detector 54, as indicated by block 64.

After the optical isolator 10 has been connected to the alignment laser 52 and the laser power detector 54, the alignment laser 52 may be activated or "turned on," as indicated in block 66. When the alignment laser 52 is activated, the light 20 will proceed through the optical isolator 10, and the laser power detector 54 may measure the light power level exiting the optical isolator 10. By comparing the light power level of the light exiting the optical isolator 10 with the light power level of the alignment laser 52, the insertion loss from the optical isolator 10 may be determined, as indicated in block 68. For example, if the alignment laser 52 has a light power level of 10 W and the light power level of the light 20 exiting the optical isolator 10 is approximately 27% less than the power level of the alignment laser 52, the insertion loss from the optical isolator 10 may be approximately 1 dB. Similarly, if the power loss is approximately 5%, the insertion loss from the optical isolator will be approximately 0.2 dB, and so forth.

The technique 60 may also involve deciding whether the insertion loss from the optical isolator 10 is acceptable, as indicated in block 70. If the insertion loss is acceptable, the technique 60 may end. However, if the insertion loss is not acceptable, the technique 60 may continue. The insertion loss may not be acceptable for a variety of reasons. For example, the insertion loss may not be acceptable because the insertion loss is above a minimum insertion loss level determined theoretically or while aligning previous optical isolators 10. The determined insertion loss may also not be acceptable if the minimum insertion loss level is not known. For example, while aligning the optical isolator 10, a first execution of blocks 62-68 may yield an insertion loss of 0.4 dB. However, by adjusting the properties of the optical isolator 10, it may be possible to lower the insertion loss level, as described below. In such a case, the insertion loss level may not be acceptable until the properties of the optical isolator 10 have been sufficiently adjusted to determine an approximate range for the insertion loss at a particular laser light power level.

As described above, if the insertion loss level is not acceptable, the technique 60 may involve adjusting the properties of the optical isolator 10, as indicated in block 72. In one embodiment, adjusting the properties of the optical isolator 10 consists of optimizing the positions of the input and output fibers with respect to the collimating lenses such that the effects of the virtual lenses created by the thermal lens effect are compensated. After the properties of the optical isolator 10 have been adjusted, technique 60 will repeat blocks 62-72 until the optical isolator 10 is aligned to produce an insertion loss at an acceptable level. In one embodiment, the technique 60 is repeated until the insertion loss of the optical isolator 10 is approximately minimized for the laser light power of the alignment laser 52. For example, the technique 60 may be repeated until the insertion loss of the optical isolator 10 is less than or equal to 0.4 dB with a ten watt light power laser.

As stated above, the isolation of a conventional optical isolator will decrease as the light power increases due to thermal lenses. As such, adjusting the properties of the optical isolator may include adjusting the garnet thickness to increase and/or optimize the isolation at higher power levels. More specifically, the garnet thickness can be selected such that the Faraday rotation of the Faraday rotator 36 is greater than 45 degrees at lower power and approximately 45 degrees at a desired higher light power (e.g., 10 watts).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fiber optical isolator comprising:
a first isolator stage comprising:
a Faraday rotator configured to adjust the polarity of a light beam;
a heat sink coupled to the Faraday rotator and configured to dissipate heat generated in the Faraday rotator by the light beam, and
an input port coupled to the first isolator stage, wherein the input port is aligned to achieve an insertion loss that decreases as optical power increases to at least one level greater than 2 watts.

2. The fiber optical isolator, as set forth in claim 1, comprising a second isolator stage coupled in series with the first isolator stage, wherein the second isolator stage is substantially similar to the first isolator stage.

3. The fiber optical isolator, as set forth in claim 1, comprising a polarizer arrayed in an optical line of sight with the Faraday rotator.

4. The fiber optical isolator, as set forth in claim 1, wherein the heat sink comprises gadolinium gallium garnet.

5. The fiber optical isolator, as set forth in claim 1, wherein the Faraday rotator comprises yttrium-iron-garnet.

6. A method of manufacturing a fiber optic isolator, the method comprising:
coupling a Faraday rotator to a heat sink, wherein the heat sink is configured to dissipate heat generated in the Faraday rotator by a light signal; and
aligning an input fiber with a collimating lens so that insertion loss decreases as a power level of the light signal increases at power levels less than 2 watts.

7. The method, as set forth in claim 6, comprising coupling a polarizer to the Faraday rotator.

8. The method, as set forth in claim 6, comprising aligning the input fiber and an output fiber of the fiber optic isolator to generally minimize the insertion loss of the fiber optic isolator for a light power of approximately 10 watts.

9. The method, as set forth in claim 6, comprising installing another Faraday rotator and another heat sink inside the fiber optic isolator.

10. The method, as set forth in claim 6, wherein coupling a Faraday rotator to the heat sink comprises constructing a Bismuth doped yttrium-iron-garnet crystal grown on a gadolinium gallium garnet substrate.

11. A fiber optic component comprising:

an optical isolator;

an input port coupled to the optical isolator and configured to receive a light beam; and an output port coupled to the optical isolator and aligned with the optical isolator such that the insertion loss generated by the fiber optic component will decrease as a light power of the light beam increases until a minimum value of insertion loss is reached at a light power of at least 2 watts.

12. The fiber optic component, as set forth in claim 11, wherein the output port is aligned such that the insertion loss will decrease as the light power rises until a minimum value of insertion loss is reached at an light power of at least 10 watts.

13. The fiber optic component, as set forth in claim 11, wherein the optical isolator comprises a Faraday rotator.

14. The fiber optic component, as set forth in claim 11, wherein the output port is aligned to at least partially compensate for an effect of a thermal lens generated in the optical isolator.

* * * * *